United States Patent
Asao et al.

(10) Patent No.: US 9,270,145 B2
(45) Date of Patent: Feb. 23, 2016

(54) ELECTRIC POWER STEERING DEVICE

(75) Inventors: Yoshihito Asao, Chiyoda-ku (JP);
Akihiko Mori, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 315 days.

(21) Appl. No.: 13/598,777

(22) Filed: Aug. 30, 2012

(65) Prior Publication Data

US 2013/0187517 A1    Jul. 25, 2013

(30) Foreign Application Priority Data

Jan. 25, 2012    (JP) ................. 2012-012576

(51) Int. Cl.
*H02K 1/18* (2006.01)
*H02K 11/00* (2006.01)
*H02K 5/04* (2006.01)

(52) U.S. Cl.
CPC .................. *H02K 1/185* (2013.01); *H02K 5/04* (2013.01); *H02K 11/0068* (2013.01)

(58) Field of Classification Search
CPC ..... H02K 11/0068; H02K 1/185; H02K 5/04; H02K 5/15; H02K 5/26
USPC ............. 310/64, 68 B, 89, 216.113, 216.129, 310/216.127
See application file for complete search history.

(56) References Cited

U.S. PATENT DOCUMENTS

| | | | |
|---|---|---|---|
| 4,835,428 A * | 5/1989 | Komurasaki et al. ....... | 310/68 D |
| 6,246,142 B1 | 6/2001 | Asao et al. | |
| 6,337,530 B1 * | 1/2002 | Nakamura et al. ..... | 310/216.066 |
| 6,577,030 B2 * | 6/2003 | Tominaga et al. .......... | 310/68 B |
| 7,023,113 B2 * | 4/2006 | Tajima et al. ............... | 310/68 D |
| 7,196,439 B2 * | 3/2007 | Pierret et al. ..................... | 310/58 |
| 7,602,095 B2 * | 10/2009 | Kusase et al. ................. | 310/263 |
| 8,227,948 B1 * | 7/2012 | Fox et al. ........................ | 310/89 |
| 2011/0018374 A1 | 1/2011 | Yamasaki et al. | |
| 2012/0098361 A1 | 4/2012 | Yamasaki et al. | |
| 2012/0098365 A1 | 4/2012 | Yamasaki et al. | |
| 2012/0098366 A1 | 4/2012 | Yamasaki et al. | |

(Continued)

FOREIGN PATENT DOCUMENTS

| | | |
|---|---|---|
| JP | 03-052550 A | 3/1991 |
| JP | 05-088163 U | 11/1993 |

(Continued)

OTHER PUBLICATIONS

Japanese Office Action, issued Mar. 18, 2014, Patent Application No. 2012-012576.

(Continued)

*Primary Examiner* — Thomas Truong
(74) *Attorney, Agent, or Firm* — Sughrue Mion, PLLC; Richard C. Turner

(57) ABSTRACT

An electric power steering device includes a first housing 6 and a second housing 7, which are respectively provided at both end portions in an axial direction of a stator 2 of the motor 1, for sandwiching the stator 2; and a movement suppressing means 22 that prevents the sandwiched stator 2 from moving in a circumference direction of the stator 2 with respect to the first housing 6 and the second housing 7; wherein at least one of the first housing 6 and the second housing 7 is fitted to a portion of the stator 2, and the movement suppressing means 22 is provided at the portion for fitting.

10 Claims, 5 Drawing Sheets

(56) References Cited

U.S. PATENT DOCUMENTS

| | | |
|---|---|---|
| 2012/0098391 A1 | 4/2012 | Yamasaki et al. |
| 2012/0104886 A1 | 5/2012 | Yamasaki et al. |
| 2012/0229005 A1 * | 9/2012 | Tominaga et al. .......... 310/68 B |

FOREIGN PATENT DOCUMENTS

| | | |
|---|---|---|
| JP | 07-336945 A | 12/1995 |
| JP | 09-252563 A | 9/1997 |
| JP | 2000-278892 A | 10/2000 |
| JP | 2007-166857 A | 6/2007 |
| JP | 2007-331428 A | 12/2007 |
| JP | 2011-030405 A | 2/2011 |
| WO | 99-21265 A1 | 4/1999 |
| WO | WO 2011114554 A1 * | 9/2011 |

OTHER PUBLICATIONS

Japanese Office Action, issued Aug. 20, 2013, Patent Application No. 2012-012576.

* cited by examiner (a)

(b)

ELECTRIC POWER STEERING DEVICE

BACKGROUND OF THE INVENTION

1. Technical Field

The present invention relates to an electric power steering device including a motor for assisting a steering power transmitted from a driver.

2. Background Art

A conventional electric power steering device is composed of a motor for mainly assisting a steering power transmitted from a driver, a control device for controlling the motor, a linking device for linking a deceleration mechanism that decrease a power output of the motor and transmits the output power to a steering shaft, and sensors for detecting the steering power and the like transmitted from the driver. Moreover, as one of countermeasures for downsizing the electric power steering device, a control device-integrated electric power steering device, in which a motor and a control device are integrated, already exists (for example, refer to Patent Document 1 and Patent Document 2).

In the conventional electric power steering devices in which a motor and a control device are integrated, there are various types of electric power steering devices in which the control device is disposed in parallel to a direction where a shaft core of the output shaft of the motor is extended (hereinafter, refer to an axial direction) so as to be mounted on the motor, or the control device is vertically disposed with respect to the axial direction so as to be mounted on the motor. However, components has been down sized and integrated, and assembling works of the components has been more complicated.

CONVENTIONAL ART DOCUMENT

Patent Document

[Patent Document 1]
Japanese Laid-Open Patent Publication No. 2011-30405
[Patent Document 2]
Japanese Laid-Open Patent Publication No. 2007-166857

SUMMARY OF THE INVENTION

Problems to be Solved by the Invention

In the conventional electric power steering device disclosed in Patent Document 1, there have been problems in that a stator, a rotor and the like are installed in a motor case, and in particular, the stator is wholly covered by the motor case, so that radiation performance of the motor is decreased. In addition, it is required that the stator is constrained in the motor case, and the stator is prevented from being moved or rotated when the motor is rotated. Moreover, high accuracy for sizes of the motor case and the stator in a diameter direction is required. Furthermore, it is required that the stator are pressed and inserted to the motor case at assembling the components, and there have been problems in that more improvement and the like are required from a viewpoint of an assembling capability.

Moreover, although the conventional electric generator disclosed in Patent Document 2 is configured in such a way that a stator is sandwiched by a front housing and a rear housing, which include an inlet and an outlet, there has been a problem in that the stator is moved toward the both housings and rotated when a large rotational power is generated in a motor.

The present invention has been made to solve the above-described problems of a conventional electric power steering device, and an object of the invention is to provide an electric power steering device in which a radiation capability is improved, and a holding power for preventing a stator from being moved or rotated can be retained.

Means for Solving Problems

An electric power steering device of the present invention, which has a motor that generates a power output for assisting a steering power transmitted from a driver, includes a first housing and a second housing, which are respectively provided at both end portions in an axial direction of a stator of the motor, for sandwiching the stator; and a movement suppressing means for preventing the sandwiched stator from moving in a circumference direction of the stator with respect to the first housing and the second housing; wherein at least one of the first housing and the second housing is fitted to a portion of the stator, and the movement suppressing means is provided at the fitting portion.

Effects of the Invention

According to the electric power steering device of the present invention, a radiation capability of the motor, and in particular, a radiation capability of the stator can be improved, and a constraint power for the stator in an axis direction or a rotational direction can be ensured.

DETAILED DESCRIPTION OF THE PREFERRED EMBODIMENTS

Embodiment 1

Figure 1:
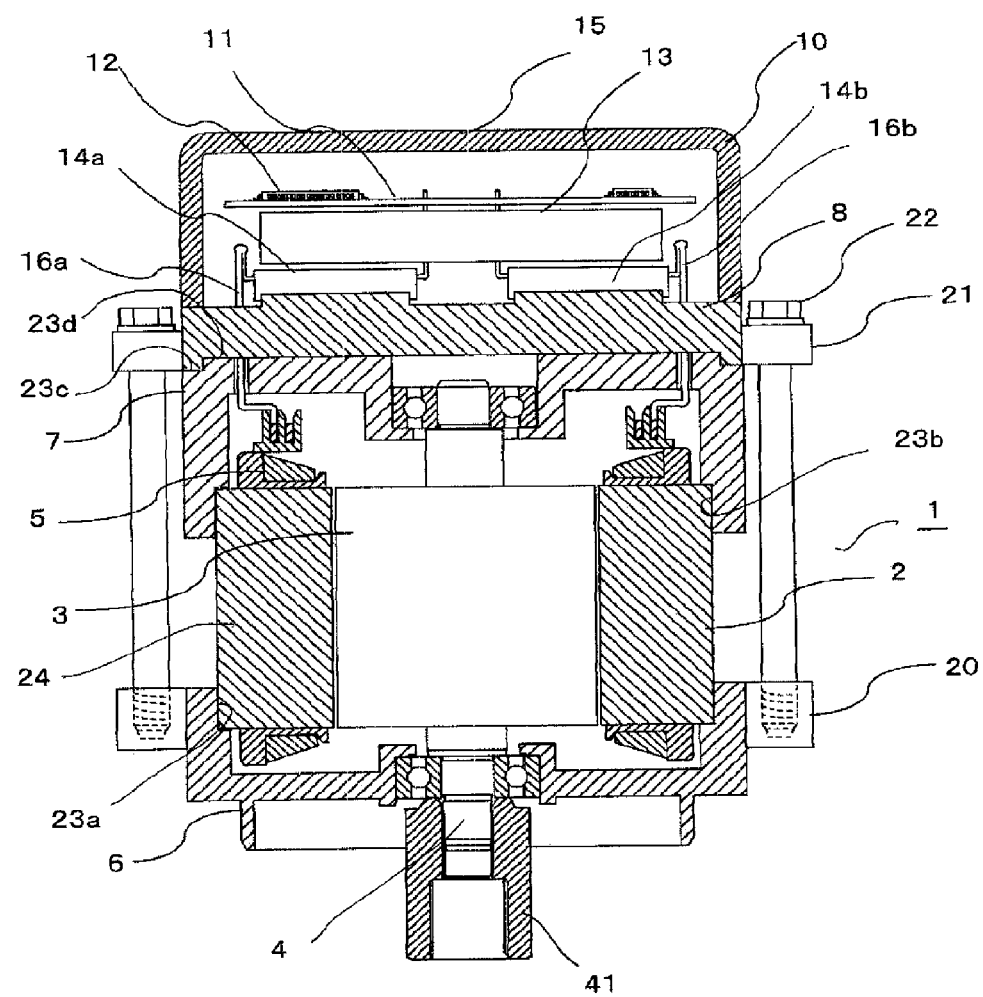
FIG. 1 is a cross-sectional diagram illustrating an electric power steering device according to Embodiment 1 of the present invention.

Hereinafter, an electric power steering device according to Embodiment 1 of the present invention will be explained in reference to the drawings. FIG. 1 is a cross-sectional diagram illustrating the electric power steering device according to Embodiment 1 of the present invention. In FIG. 1, a motor 1 includes a stator core 24 composed of a laminated iron core on which a plurality of iron plates are laminated, a stator 2 composed of a stator winding 5 attached to the stator core 24, a rotor 3 inserted to inner space in the stator 2, and an output shaft 4 fixed to the center portion of the rotor 3. A first side, from which a power output of the output shaft 4 is outputted, is called as a front side (lower side in FIG. 1), and a second side, which is a reverse side of the first side, is called as a rear side (upper side in FIG. 1). A front housing 6 as a first housing and a rear housing 7 as a second housing are respectively attached to a front side and a rear side of the stator 2, and the stator 2 is sandwiched by the front housing 6 and the rear housing 7. Therefore, the stator 2 doesn't include a portion for fixing itself in a shaft core direction.

A control unit 10, which is mounted on an outside (upper side in FIG. 1) of an axial direction of the rear housing 7, includes a heat sink 8, power modules 14*a* and 14*b* including switching elements and the like, which compose an inverter circuit as a driving circuit for controlling electric power supplied to the stator winding 5, a relay member 13, and a control board 11 on which a microcomputer 12 for controlling the switching elements and the like of the power modules 14*a* and 14*b*, and the control unit 10 has a structure in which these components are stacked in the shaft core direction.

A case 15 of the control unit 10 is fixed to an end surface of the heat sink 8 in the axial direction, and houses the power modules 14*a* and 14*b*, the relay member 13, the microcomputer 12, and the control board 11. The heat sink 8, the power modules 14*a* and 14*b*, the relay member 13, and the case 15 are arranged in a direction where a plane, on which the components are extended, is vertical with respect to the axial direction.

Winding end portions 16*a* and 16*b* of the stator winding 5 are respectively extended in the axial direction, and penetrated through holes formed in the heat sink 8, whereby the winding end portions are respectively connected to the power modules 14*a* and 14*b* in the case 15 of the control unit 10. The microcomputer 12 is connected to the power modules 14*a* and 14*b* via a plurality of signal conductors formed on the relay member 13, and control signals outputted from the microcomputer 12 are supplied to the switching elements of each of the power modules 14*a* and 14*b* via the predefined signal conductors. Moreover, electric voltage signals and electric current signals of the rotor winding of the motor 1, which are outputted from each of the power modules 14*a* and 14*b*, are inputted to the microcomputer 12 via the other signal conductors.

The microcomputer 12 calculates a control value for the motor 1 based on inputted voltage signal and current signal of the motor 1, and a signal of a steering torque transmitted from a driver, which is detected by a sensor (not illustrated), and inputs a control signal according to the control value into each of the power modules 14*a* and 14*b*. The inverter circuit composed of the switching elements of the power modules 14*a* and 14*b* is controlled by PWM (pulse width modulation) method based on the control signal inputted from the microcomputer 12, and electric power supplied to the stator winding 5 of the motor 1 is controlled so as to control a power output of the motor 1. The power output obtained from the output shaft 4 of the motor 1 is transmitted to a deceleration mechanism (not illustrated) via a linking device 41 and supplied to a steering shaft (not illustrated) as an assist torque.

A concave portion 23*a* having an annular shape is formed on an inner periphery at a rear side of the front housing 6, and an end edge at a front side of the stator 2 is fitted into the concave portion 23*a*. A concave portion 23*b* having an annular shape is formed on an inner periphery at a front side of the rear housing 7, and an end edge at a rear side of the stator 2 is fitted into the concave portion 23*b*. Moreover, a concave portion 23*c* having an annular shape is formed on an end surface at a rear side of the rear housing 7 and fitted to a convex portion 23*d* formed on an end surface at a front side of the heat sink 8.

Each of multiple flange portions 21 formed at an outer circumference portion of the heat sink 8 includes a through hole in which each of through bolts 22 as a fixing member is penetrated, and each of multiple flange portions 20 formed at an outer circumference portion of the front housing 6 includes a female screw that is screwed by a male screw at a tip of the through bolt 22. Each of multiple through bolts 22 is penetrated through the through hole of each of the flange portions of the heat sink 8, and screwed into a female screw of each of the flange portions 20 of the front housing 6. Each of the through bolts 22 is screwed into each of the flange portions 20, whereby the heat sink 8 and the front housing 6 are tightened in a direction where those are approached to each other.

The flange portions 20 of the front housing 6 and the flange portions 21 of the heat sink 8 are provided at positions which are separated each other, so that it is a desirable that a distance between the positions is short. Therefore, the flange portions 20 of the front housing 6 are formed at an end edge, which is nearest to a heat sink side in the axial direction of the front housing 6, in other words, at a position neighboring the end portion of the stator 2, and the flange portions 21 of the heat sink 8 are formed at a position, which is nearest to a front housing side in the axial direction of the heat sink 8, in other words, at a position neighboring the end portion of the stator 2.

In addition, a flange portion or the like may be provided in such a way that the case 15 of the control unit 10 is tightened with the heat sink 8 by the through bolt 22 instead of fixing the case 15, as illustrated in FIG. 1, to the outer end surface in the axial direction of the heat sink 8. Moreover, although the electric power steering device has a configuration in which the female screws are provided at the flange portions 20 of the front housing 6, it may be considerable that the female screws are not formed at any of the flange portions, and through holes are formed, instead of forming all female screws, so as to tight the through bolt 22 by nuts.

The heat sink 8 and the front housing 6 are linked by the through bolts 22, whereby the front housing 6, the stator 2, the rear housing 7, and the heat sink 8 are integrally fixed. Thus, the electric power steering device is configured in such a way that the front housing 6, the stator 2, the rear housing 7, and the heat sink 8 are integrally fixed, so that each of components can be certainly combined with a simple configuration.

By the way, as described above, the front housing 6 and the heat sink 8 can be fixed by fastening the through bolts, and the stator 2 and the rear housing 7, which exist between the components, are sandwiched by the front housing 6 and the heat sink 8 and integrally fixed. However, a stator current is passed through the stator winding 5 provided on the stator 2, and the rotor 3 having magnetic poles is rotated in accordance with a magnetic field generated by passing the stator current, so that generation of the magnetic field is affected by a shape of the stator 2.

Therefore, it is no good idea that a shape of the stator 2 is variously changed in order to fix the stator 2. Moreover, because the stator core 24 is configured by laminating many steel plates, which are respectively formed in a thin plate shape, it is also no good idea that a shape of each of the steel plates is variously changed. On the other hand, the front housing 6 and the rear housing 7 are made from aluminum in order to consider workability, and it is a main subject that configuration components are fixed and sustained, so that shapes of the front housing 6 and the rear housing 7 can be relatively and easily varied. Therefore, as described above, the electric power steering device is configured in such a way that the concave portions 23*a* and 23*b* are respectively formed on the front housing 6 and the rear housing 7, and both end edges of the stator 2 are respectively fitted into the concave portions 23*a* and 23*b*.

Although the front housing 6, the heat sink 8, the stator 2, the rear housing 7, the heat sink 8, and the case 15 are integrally fixed by the above-described configuration, there is another case in which a limitation for a movement of the stator 2 in a circumference direction is more required. In particular, the stator 2 is configured by the laminated steel plates as described above. On the other hand, the front housing 6 and the rear housing 7 made from, for example, aluminum being different from a material of the steel plates, and expansion coefficients with respect to temperature are different in accordance with a difference of materials. In particular, there is a case in which the front housing 6 and the rear housing 7 are loosely fixed at high temperature, so that it is required that the stator 2 is solidly fixed to both housings, and in particular, it is required that the above-described movement of the stator 2 at high temperature is prevented.

Figure 2:
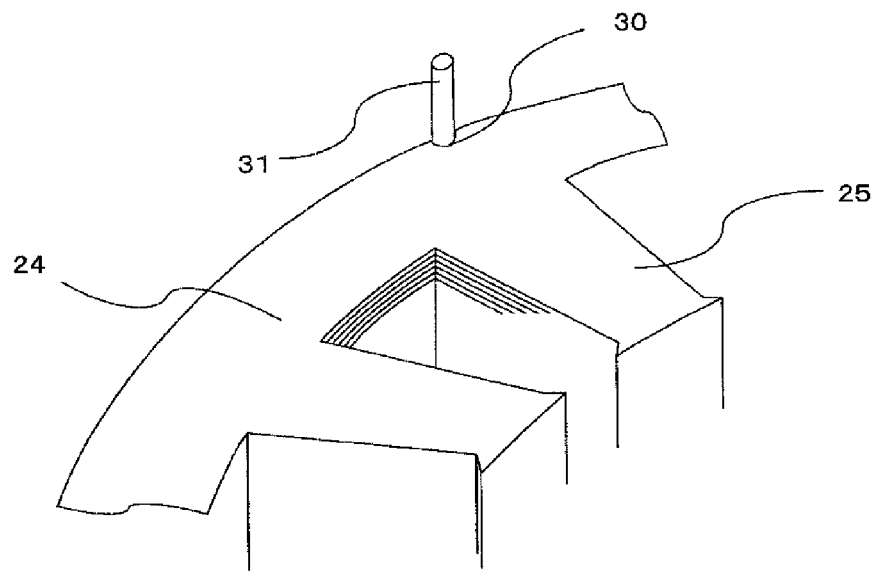
FIG. 2 are explanatory diagrams illustrating a stator of a motor in the electric power steering device according to Embodiment 1 of the present invention.
Figure 2:
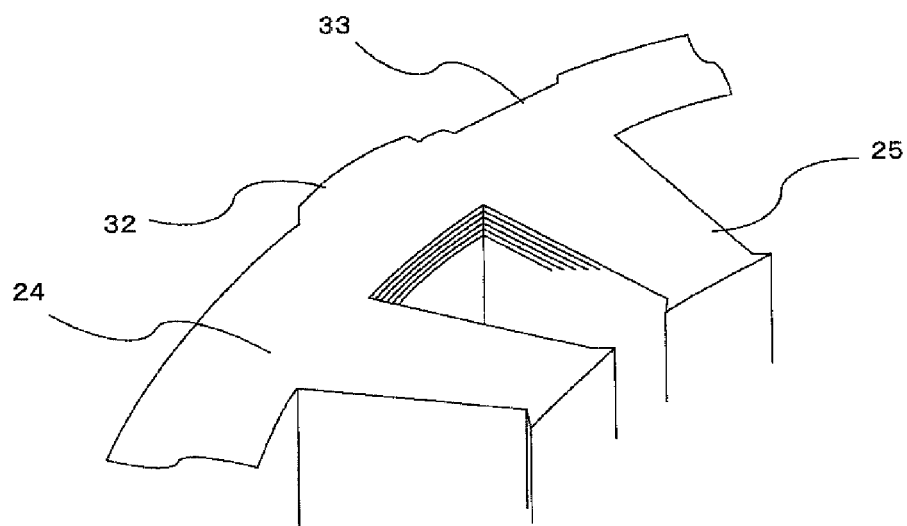

Thus, the electric power steering device according to Embodiment 1 of the present invention has a configuration as described later. FIG. 2 are explanatory diagrams illustrating a stator of a motor in the electric power steering device according to Embodiment 1 of the present invention, and FIG. 2A and FIG. 2B indicate different configuration examples. Firstly, in FIG. 2A, the stator core 24 includes concave grooves 30, which are extended in the axial direction, at both end edges of the outer circumference. At least two grooves 30 are provided in a circumference direction of the stator core 24.

As illustrated in FIG. 2A, it is desirable that the grooves 30 are positioned at an outer circumference portion corresponding to teeth 25 of the stator core 24. Moreover, a length of the grooves 30 in the axial direction is not equal to a total length of the stator core 24 in the axial direction, and a length of a first groove 30 at a side, on which the stator core 24 is fitted to the front housing 6, is equal to a length, in the axial direction, corresponding to a portion fitting to the front housing 6. Meanwhile, a length of a first groove 30 at a side, on which the stator core 24 is fitted to the rear housing 7, is equal to a length, in the axial direction, corresponding to a portion fitting to the rear housing 7.

On inner circumference surfaces of the concave portions 23a and 23b, which are respectively fitted to the front housing 6 and the rear housing 7, concave grooves (not illustrated) respectively corresponding to the concave grooves 30 of the stator core 24 are provided.

When the stator 2 is fitted to the front housing 6 and the rear housing 7, a metallic pin 31 is buried in each of the concave grooves 30 formed at the outer circumferences of the both end edges in the shaft core direction of the stator core 24. The pin 31 is engaged to the each of the concave grooves formed in the concave portions 23a and 23b of the front housing 6 and the rear housing 7. Thereby, the stator 2 can be prevented from being rotated in a circumference direction of the stator 2 with respect to the front housing 6 and the rear housing 7.

A movement suppressing means is composed of the concave grooves 30, the pin 31, and the concave grooves formed at the inner circumference surfaces of the concave portions 23a and 23b of the front housing 6 and the rear housing 7.

In addition, in the above-described electric power steering device, although the concave grooves 30 are respectively formed at the outer circumferences of the both end edges in the shaft core direction of the stator core 24, the concave grooves 30 may be formed at only the outer circumference of the unilateral end edge in the shaft core direction of the stator core 24. Moreover, in some cases, it is not required that the above-described concave grooves are formed on the inner circumference surface of the concave portions 23a and 23b of the front housing 6 and the rear housing 7.

FIG. 2B indicates another configuration example for preventing the stator 2 from being rotated in a circumference direction, and a protrusion 32 and a concave portion 33, which are extended in the shaft core direction, are formed at a portion on the outer circumference surface of the stator core 24. On the other hand, a concave portion (not illustrated) and a convex portion (not illustrated), which are respectively fitted to the protrusion 32 and the concave portion 33 of the stator core 24 on the inner circumference surface of each of the concave portions 23a and 23b fitted to the stator core 24 of the rear housing 7. The above-described protrusion 32 formed on the stator core 24 can be used as a components for deciding a position when the stator core 24 is formed by laminating many steel plates.

Another movement suppressing means is composed of the convex portion 32, the concave portion 33, and the concave portion (not illustrated) and the convex portion (not illustrated), which are formed on each of the inner circumference surfaces of the concave portions 23a and 23b fitted to the stator core 24, of the front housing 6 and the rear housing 7.

In addition, although the convex portion 32 may be provided at an arbitrary position, it is desirable that the concave portion 33 is provided at an outer circumference portion of a portion corresponding to the teeth 25 in a similar way as illustrated in FIG. 2A.

When the stator 2 is fitted to the front housing 6 and the rear housing 7, the convex portion 32 and the concave portion 33 of the stator core 24 are respectively fitted to the above-described concave portion and convex portion, which are respectively provided at the concave portions 23a and 23b of the front housing 6 and the rear housing 7. Thereby, the stator 2 is prevented from being rotated, with respect to the front housing 6 and the rear housing 7, in a circumference direction of the stator 2.

As described above, in the electric power steering device according to Embodiment 1 of the present invention, the front housing, the stator, the ear housing, the heat sink and the like can be totally fixed, and the rotation of the stator in a circumference direction can be certainly prevented. Moreover, most of components of the stator are exposed, so that radiation performance of the stator is improved.

Embodiment 2

Figure 3:
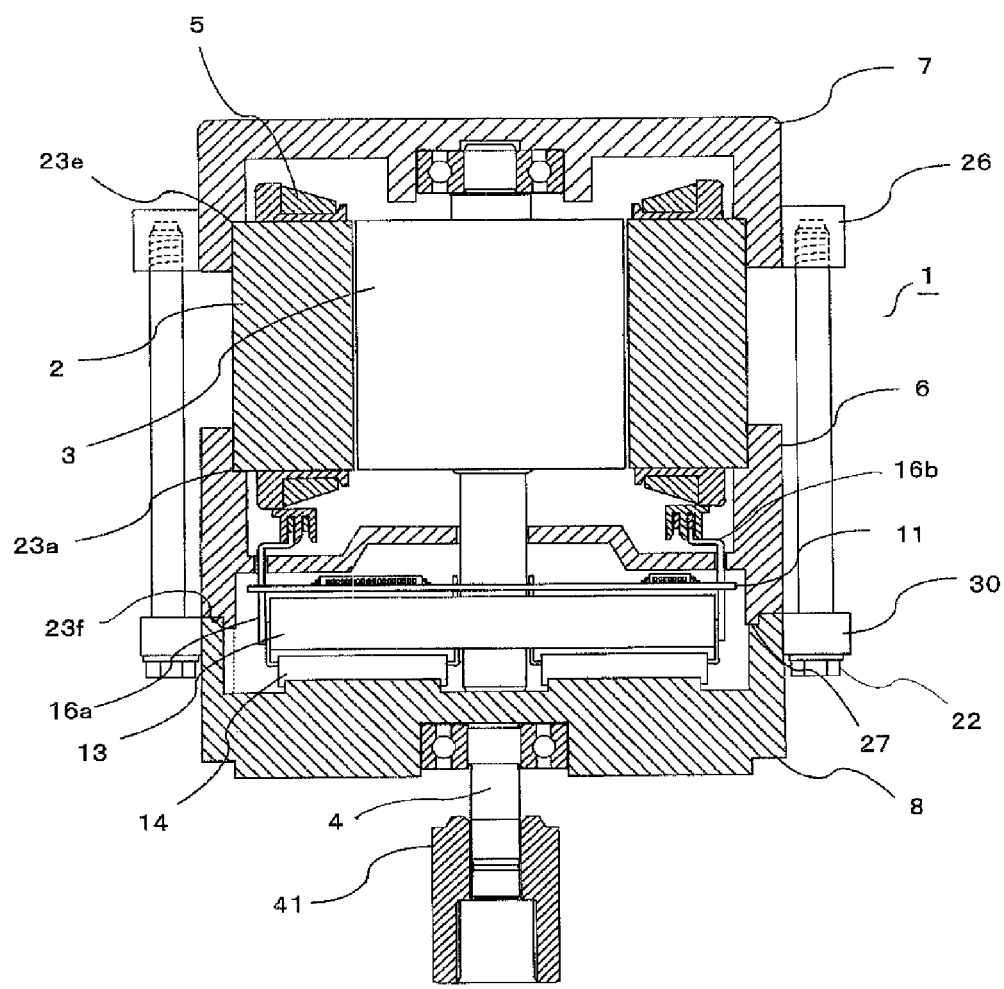
FIG. 3 is a cross-sectional diagram illustrating an electric power steering device according to Embodiment 2 of the present invention.

In an electric power steering device according to Embodiment 2 of the present invention, a control device is mounted at an output side, in other words, at a front side of the motor. FIG. 3 is a cross-sectional diagram illustrating the electric power steering device according to Embodiment 2 of the present invention, and reference symbols, which are the same as those in FIG. 1, refer to the same or equivalent parts. In the configuration of the electric power steering device, a heat sink 8, power modules 14a and 14b, a relay member 13, and a control board 11 are sequentially laminated and assembled in order of a long distance between each of these components and a motor 1. Therefore, each of kindred components can be used in an equivalent concept according to Embodiment 1, so that a design of the arrangement of the control device can be easily changed from a front side as described in Embodiment 1 to a rear side as described in Embodiment 2.

There are differences between a design according to Embodiment 1 and a design according to Embodiment 2, in which extending directions of the winding end portions are different, and shapes of the front housings and rear housings are different. In a configuration according to Embodiment 1, the winding end portions 16a and 16b are extended from the stator winding 5 to the rear side of the motor 1, and penetrate the heat sink 8 so as to be connected to the connection terminals of the power modules 14a and 14b, whereas in a configuration according to Embodiment 2, winding end portions 16a and 16b are extended from a stator winding 5 to the front side of the motor 1, and penetrate a front housing 6, and moreover, pass through the control board 11 and the relay member 13 so as to be connected to the connection terminals of the power modules 14a and 14b.

Moreover, a rear housing 7 includes a concave portion 23e and a flange portion 26 for contacting to a stator 2. The front housing 6 has no flange portion. The front housing 6 includes a concave portion 23a for fitting to the stator 2, and a concave portion 23f for fitting to the heat sink 8 at both end portions in the axial direction. The heat sink 8 has no through hole for penetrating the winding end portions 16a and 16b, and includes a flange portions 30. Flange portions 26 of the rear housing 7 include female screws for engaging to male screws at tips of through bolts 22. Furthermore, the flange portions 30 of the heat sink 8 include through holes for penetrating the through bolts 22. The plurality of through bolts 22 as fixing members penetrate through holes of the flange portions 30 of the heat sink 8, and those are engaged to the female screws of the flange portions 26 of the rear housing 7. Each of the through bolts 22 is engaged to each of the flange portions 26 of the rear housing 7, whereby the heat sink 8 and the rear housing 7 are tighten in a direction where those are approached to each other.

The flange portions 26 of the rear housing 7 and the flange portions 30 of the heat sink 8 are provided at positions which are separated each other, so that it is a desirable that a distance between the positions is short. Therefore, the flange portions 26 of the rear housing 7 are formed at an end edge, which is nearest to a heat sink side in the axial direction of the front housing 6, in other words, at a position neighboring the end portion of the stator 2, and the flange portions 30 of the heat sink 8 are formed at a position, which is nearest to a rear housing 7 side in the axial direction of the heat sink 8, in other words, at a position neighboring the end portion of the stator 2.

The heat sink 8 and the front housing 6 are linked by each of the through bolts 22, whereby the front housing 6, the stator 2, and the rear housing 7 are integrally fixed. As described above, the electric power steering device is configured so as to integrally fix the heat sink 8, the front housing 6, the stator 2, and the rear housing 7, whereby each of the components can be certainly combined with a simple configuration.

Each of the components are respectively fitted by the above-described configuration, and radiation performance of the stator can be improved by fixing the edge portions to each other by using the through bolts as fixing members, whereby the components are integrally assembled. As illustrated in FIG. 3, a concave portion 27 for being attached to the front housing 6 is formed at an upper right end of the heat sink 8 in FIG. 3, and the concave portion 27 is not formed at a left end. However, the concave portion 27 is formed at any one of the ends as described above, whereby the heat sink 8 and the front housing 6 are certainly fitted to each other.

In addition, although the through bolts 22 are penetrated in a direction in Embodiment 2, which is opposite to a direction in Embodiment 1, a fitting operation can be realized even if the through bolts 22 are penetrated in any one of directions, so that it may be determined by considering an assembling capability that the through bolts 22 must be penetrated in each of the directions. Moreover, although the electric power steering device has a configuration in which the female screws are provided at the flange portions 20 of the rear housing 7, it may be considerable that the female screws are not formed at any of the flange portions, and through holes are formed, instead of forming all female screws, so as to tight the through bolts 22 by nuts.

Embodiment 3

Figure 4:
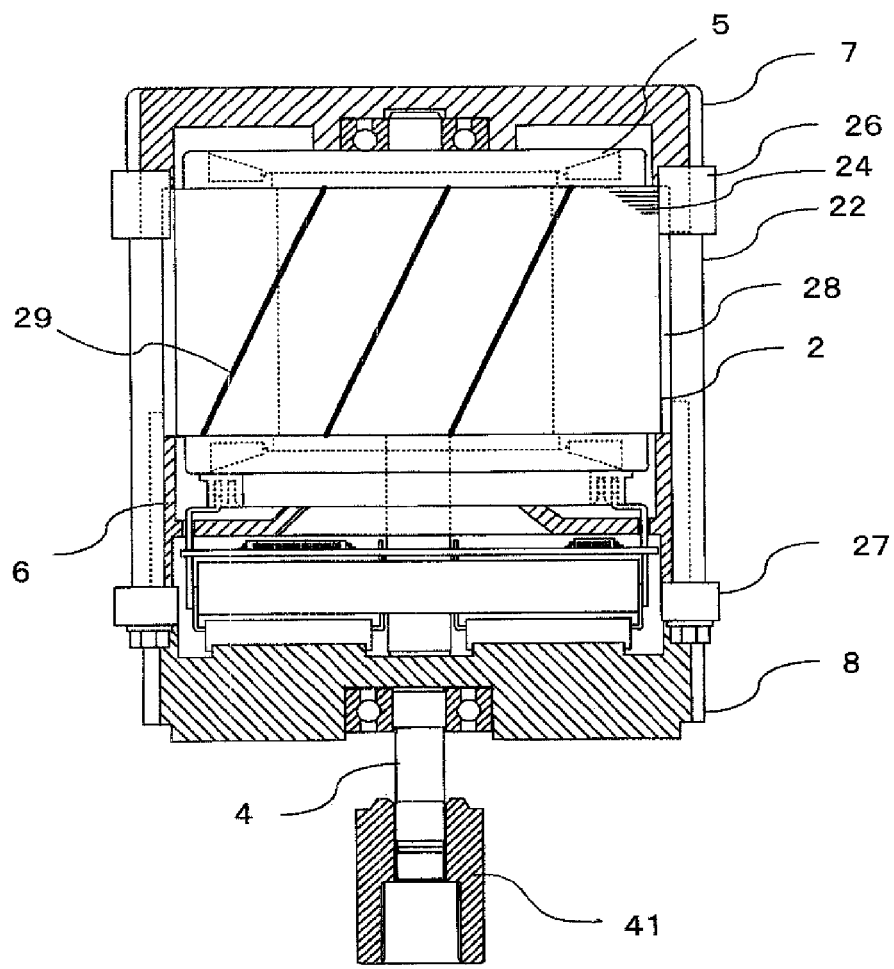
FIG. 4 is a cross-sectional diagram illustrating an electric power steering device according to Embodiment 3 of the present invention.
Figure 5:
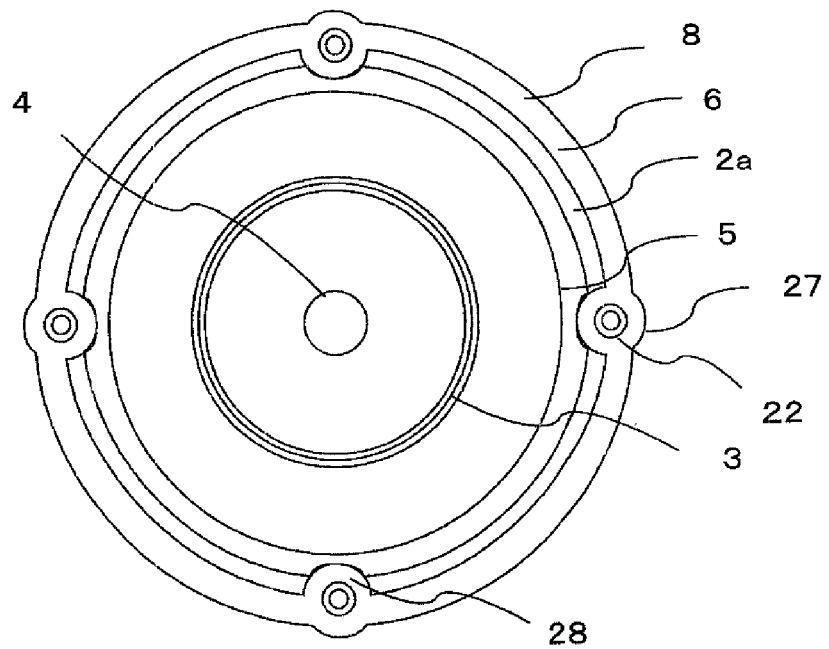
FIG. 5 is a plane view illustrating a rear housing detached from the electric power steering device according to Embodiment 3 of the present invention.

Hereinafter, an electric power steering device according to Embodiment 3 of the present invention will be explained in reference to the drawings. FIG. 4 is a cross-sectional diagram illustrating the electric power steering device according to Embodiment 3 of the present invention, and FIG. 5 is a plane view illustrating a rear housing detached from the electric power steering device according to Embodiment 3 of the present invention. Differences between the electric power steering device according to Embodiment 3 and the electric power steering device according to Embodiment 2 are positions of the edge portions and configurations of the stator cores. In addition, reference symbols, which are the same as those in FIG. 3, refer to the same or equivalent parts.

In FIG. 4 and FIG. 5, a stator 2, a rotor 3, a front housing 6, and a heat sink 8 are configured, in a similar way in Embodiment 2, toward a lower direction with respect to a rear housing 7. Flange portions 26 of the rear housing 7 are provided at four positions which are evenly spaced at end edges in the axial direction. Moreover, flange portions 27 of the heat sink are provided at four positions which are evenly spaced at end edges in the axial direction. These flange portions 26 and flange portions 27 are configured in such a way that a degree of protruding outside of an outer circumference surface of the motor 1 is decreased in comparison with the flange portions 26 and flange portions 27 according to Embodiment 2 in FIG. 3.

Therefore, depressions 28 are formed at portions opposing the rear housing 7, the heat sink 8, the front housing 6, and each of the flange portions 26 and 27, and the depressions 28 are arranged in such a way that at least of the partial through bolts 22 are inserted to the depressions 28. Thus, the depressions 28 are provided at positions of the flange portions 26 and 27, and at each of portions corresponding to the flange portions 26 and 27, whereby the maximum outside diameter of the electric power steering device can be reduced.

A direction of the output shaft 4 is fixed, and a rotational direction of the output shaft 4 is regulated, whereby a high pressure is applied to the stator 2. Therefore, it is required that a stator core 24 has a configuration in which steel plates are suitably laminated so as to withstand the applied pressure. Thus, steel plates composing the stator core 24 are mutually linked in a circumference direction. For example, in any of cases where the stator core 24 is formed by laminating steel plates having a circular shape, or formed by laminating steel plates having a band-like shape, or formed by laminating steel plates having a band-like shape in a spiral state, an outer circumference surface, from one end portion to the other end portion in the axial direction, of the stator core 24 is welded and bonded. A weld 29 is illustrated in FIG. 4. Namely, in order to integrally form the stator core 24, the outer circumference surface of the laminated steels is bonded by the weld 29.

In addition, a weld direction of the outer circumference surface of the stator core 24 is inclined with respect to an axial direction as illustrated for the weld 29 in FIG. 4, or may be parallel in the axial direction. In other case, a weld may be provided at the depression 28. In addition, because the weld 29 is inclined with respect to the axial direction as illustrated in FIG. 4, there are advantages in which a pressurization force can be scattered, and a circular shape of the stator 2 can be kept, even if the pressurization force is partly converged toward the stator 2.

As described above, in the electric power steering device according to Embodiment 3 of the present invention, flange portions are provided at both end portions in order to fix a plurality of separated portions, and those are combined by through bolts as fixing members, and the other portions are fitted each other, whereby all portions can be easily fixed. Moreover, a radiation capability can be improved by arranging portions generating much heat quantities between the separated portions. Furthermore, each of kindred components can be used in an equivalent concept according to Embodiment 1, so that a design of the arrangement of the control device can be easily changed from a front side as described in Embodiment 1 to a rear side as described in Embodiment 3.

In addition, it is possible within a scope of the present invention that the components in each of the embodiments are freely combined, or the components in each of the embodiments are suitably modified or omitted (in a case where a number of embodiments is larger than 2).

What is claimed is:

1. An electric power steering device having a motor that generates a power output for assisting a steering power transmitted from a driver, the electric power steering device comprising:
    a first housing and a second housing, which are respectively provided at both end portions in an axial direction of a stator of the motor, for sandwiching the stator; and
    a movement suppressing means for preventing the sandwiched stator from moving in a circumference direction of the stator with respect to the first housing and the second housing;
    a control unit which has a driving circuit for driving the motor, a control board for outputting control signals to the driving circuit, and a heat sink for heat dissipation;
    wherein at least one of the first housing and the second housing includes an annular shaped concave portion which is formed on an inner periphery of the at least one of the first housing and the second housing, and the at least one of the first housing and the second housing is fitted to a portion of the stator by fitting an end edge of the stator into the annular shaped concave portion of the at least one of the first housing and the second housing,
    the first housing and the second housing are pressed, in a direction where they are approached to each other, by a fixing member via the heat sink,
    the movement suppressing means is provided at the fitted portion of the stator, and contacts on a part of the stator, and on at least one of the first housing and the second housing, in the circumference direction of the stator directly or indirectly, and suppresses that stator moves in the circumference direction of the stator, and
    the stator, the first housing, the second housing, and the control unit are juxtaposed in the axial direction of the stator, and are fixed to each other, wherein
    the movement suppressing means is composed of a first concave groove formed at the outer circumferences of the end edge of the stator in the axial direction of the stator, a second concave groove formed at the inner circumference surfaces of the annular shaped concave portion of the at least one of the first housing and the second housing in the axial direction of the stator, and a pin engaged to the first concave groove and the second concave groove
    or
    the movement suppressing means is composed of a first concave portion or a first convex portion, which are formed at the outer circumferences of the end edge of the stator, and are extended in the axial direction of the stator, and a second convex portion or a second concave portion, which are formed at the inner circumferences of the annular shaped concave portion of the at least one of the first housing and the second housing, and are extended in the axial direction of the stator and fitted to the first concave portion or the first convex portion.

2. An electric power steering device according to claim 1, wherein the heat sink includes a surface portion, on which a power module composing the driving circuit is mounted, and is disposed in state where an extension direction of the surface portion is a vertical with respect to the axial direction, and
    the heat sink, the drive circuit, and the control board are laminated in the axial direction of the stator, and constitute the control unit.

3. An electric power steering device according to claim 1, wherein
    the heat sink includes a plurality of edge portions at an outer circumference portion,
    the first housing or the second housing includes a plurality of edge portions, corresponding to the edge portions of the heat sink, at the outer circumference portion, and
    the fixing member is composed of a plurality of bolts for respectively linking the plurality of edge portions of the heat sink to the plurality of edge portions of the first housing or the second housing.

4. An electric power steering device according to claim 3, wherein the plurality of edge portions of the heat sink as well as the plurality of edge portions of the first housing or the second housing are provided at a position neighboring the stator.

5. An electric power steering device according to claim 3, wherein the stator includes a plurality of depressions extending in the axial direction at an outer circumferences of the stator, and the plurality of bolts are disposed toward the outer circumferences of the stator in a state where at least partial bolts are inserted to the plurality of depressions.

6. An electric power steering device according to claim 1, wherein the first housing is arranged at an output side of the motor, the second housing is arranged at an opposite output side of the motor, and the control unit is fixed to the second housing.

7. An electric power steering device as recited in claim 1, wherein the first housing is arranged at an output side of the motor, the second housing is arranged at an opposite output side of the motor, and the control unit is fixed to the first housing.

8. An electric power steering device according to claim 1, wherein the stator is configured by laminating a plurality of steel plates in the axial direction, and the plurality of laminated steel plates are integrally joined by a weld at an outer circumference surface of the stator.

9. An electric power steering device according to claim 8, wherein the weld is extended in an inclined direction with respect to the axial direction.

10. An electric power steering device as recited in claim 1, wherein the first housing and the second housing extend to cover portions of the electric power steering device radially inward of the stator.

* * * * *